United States Patent
Hibbert-Garibaldi et al.

(10) Patent No.: US 12,007,157 B2
(45) Date of Patent: Jun. 11, 2024

(54) TRANSPORTABLE REFRIGERATED CONTAINER AND METHOD OF DISTRIBUTION OF PERISHABLE GOODS

(71) Applicant: Caprera Limited, London (GB)

(72) Inventors: Jeremy Hibbert-Garibaldi, London (GB); Lucas John Dawe, London (GB)

(73) Assignee: Caprera Limited, London (GB)

( * ) Notice: Subject to any disclaimer, the term of this patent is extended or adjusted under 35 U.S.C. 154(b) by 0 days.

(21) Appl. No.: 17/715,550

(22) Filed: Apr. 7, 2022

(65) Prior Publication Data

US 2022/0228790 A1 Jul. 21, 2022

Related U.S. Application Data

(63) Continuation of application No. PCT/IB2020/059469, filed on Oct. 8, 2020.

(30) Foreign Application Priority Data

Oct. 9, 2019 (GB) ..................... 1914589

(51) Int. Cl.
*F25D 11/00* (2006.01)
*B60P 3/20* (2006.01)
(Continued)

(52) U.S. Cl.
CPC ............ *F25D 11/003* (2013.01); *B60P 3/205* (2013.01); *B65D 88/12* (2013.01); *B65D 88/542* (2013.01);
(Continued)

(58) Field of Classification Search
CPC ...... F25D 11/003; F25D 17/04; F25D 23/069; F25D 25/005; B60P 3/205; B65D 88/12;
(Continued)

(56) References Cited

U.S. PATENT DOCUMENTS 2,198,239 A * 4/1940 Baird ..................... F25D 13/02
312/402
2,608,420 A 8/1952 Eck
(Continued)

FOREIGN PATENT DOCUMENTS

CN   105117880 A   12/2015
CN   204956248 U   1/2016
(Continued)

OTHER PUBLICATIONS

International Search Report, International Application No. PCT/IB2020/059469 dated Apr. 15, 2021.
(Continued)

*Primary Examiner* — Saul Rodriguez
*Assistant Examiner* — Ashley K Romano
(74) *Attorney, Agent, or Firm* — Richard A. Fagin

(57) ABSTRACT

A transportable refrigerated container has an interior chamber sub-divided into separate compartments by movable partitions that allow free air circulation to maintain the compartments at the same temperature and a plurality of security doors in at least one of the sides of the container, each door affording access only to a selected respective compartment or group of compartments. A method of distributing perishable goods from a supply depot to a plurality of customers utilizes such a container. At the supply depot, goods for different customers are loaded into separate compartments and the container is then transported to a location convenient to all the customers. There, delivery drivers who can each only open a door leading to a compartment containing goods intended for a specific customer, transfer the goods from the compartment onto a smaller vehicle and deliver them to their respective customer.

18 Claims, 3 Drawing Sheets

(51) Int. Cl.
  *B65D 88/12* (2006.01)
  *B65D 88/54* (2006.01)
  *B65D 88/74* (2006.01)
  *B65D 90/00* (2006.01)
  *F25D 17/04* (2006.01)
  *F25D 23/06* (2006.01)
  *F25D 25/00* (2006.01)
  *G06Q 10/0832* (2023.01)

(52) U.S. Cl.
  CPC ....... *B65D 88/745* (2013.01); *B65D 90/0053* (2013.01); *B65D 90/0066* (2013.01); *B65D 90/008* (2013.01); *F25D 17/04* (2013.01); *F25D 23/069* (2013.01); *F25D 25/005* (2013.01); *G06Q 10/0832* (2013.01); *B65D 2590/0083* (2013.01)

(58) Field of Classification Search
  CPC .......................... B65D 88/542; B65D 88/745; B65D 90/0053; B65D 90/0066; B65D 90/008; G06Q 10/0832
  See application file for complete search history.

(56) References Cited

U.S. PATENT DOCUMENTS

| | | |
|---|---|---|
| 9,745,130 B1 | 8/2017 | Rawal |
| 10,183,806 B1 * | 1/2019 | Zeng ...................... B65D 88/12 |
| 2004/0055345 A1 * | 3/2004 | Moore ................... E05B 81/70 70/257 |
| 2005/0062344 A1 * | 3/2005 | Holt ........................ E05B 83/02 303/7 |
| 2006/0237490 A1 | 10/2006 | Twitchell |
| 2008/0036238 A1 | 2/2008 | Weeda et al. |
| 2010/0191615 A1 | 7/2010 | Robert |
| 2018/0093828 A1 * | 4/2018 | Lindbo ................. E04B 2/7403 |
| 2019/0112119 A1 * | 4/2019 | Alexander ........... F25D 11/003 |
| 2019/0160994 A1 * | 5/2019 | Letson ................. F25D 11/003 |
| 2020/0174494 A1 * | 6/2020 | Lessels ................. G06Q 50/28 |

FOREIGN PATENT DOCUMENTS

| | | |
|---|---|---|
| CN | 105 691 278 A | 6/2016 |
| CN | 107 416 376 A | 12/2017 |
| CN | 107730760 A | 2/2018 |
| CN | 107953821 A | 4/2018 |
| CN | 109 515 293 A | 3/2019 |
| DE | 20 2016 102856 U1 | 7/2016 |
| JP | H09 207648 A | 8/1997 |
| WO | 2012/097443 A1 | 7/2012 |
| WO | WO-2012097443 A1 * | 7/2012 .............. B60P 3/205 |

OTHER PUBLICATIONS

Written Opinion of the International Search Authority, International Application No. PCT/IB2020/059469 dated Apr. 15, 2021.
United Kingdom Search and Examination Report dated Mar. 26, 2021, for United Kingdom Application No. GB2015992.7.

* cited by examiner

TRANSPORTABLE REFRIGERATED CONTAINER AND METHOD OF DISTRIBUTION OF PERISHABLE GOODS

CROSS REFERENCE TO RELATED APPLICATIONS

Continuation of International Application No. PCT/IB2020/059469 filed on Oct. 8, 2020. Priority is claimed from British Patent Application No. 1914589.5 filed on Oct. 9, 2019. Both the foregoing applications are incorporated herein by reference in their entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable

FIELD OF THE INVENTION

The present invention relates to the distribution of perishable goods and in particular to the delivery of food from depots or warehouses to shops and restaurants.

BACKGROUND OF THE INVENTION

Shops and restaurants require daily, or at least frequent, delivery of perishable goods that they purchase in bulk from wholesalers. To meet this demand, wholesalers deliver daily from their depots to the individual shops and restaurants using a refrigerated lorry or a refrigerated container transported on an articulated lorry.

At the warehouse, the goods are loaded onto the container or lorry in the reverse order to the location of the customers, that is to say that goods intended for the first customer to be visited are loaded on last. The lorry then travels from one customer to the next, following a planned route, until all customers have received their orders and then returns empty to the depot. In this context, "empty" is only intended to mean devoid of goods, because the lorry may carry empty containers (such as roll cages or pallets) to be returned to the depot.

The current method of distributing perishable goods to customers suffers from several disadvantages, of which some will now be discussed.

The premises to which the goods are to be delivered are often only open during regular working hours and for this reason delivery during rush hours cannot be avoided. This prolongs the working day of the lorry drivers and increases the number of lorries required to serve all customers on a daily basis. The large number of delivery lorries that are needed increases atmospheric pollution and adds to traffic congestion.

Traffic congestion is exacerbated by the fact that the large lorries cannot avoid blocking traffic during deliveries and time taken for each delivery can be prolonged by the need to return empty containers to the depot. This requires the lorry to be reorganized each time in order for the driver to retain access to the goods yet to be delivered.

SUMMARY OF THE INVENTION

With a view to mitigating at least some of the foregoing disadvantages, the present invention provides in accordance with a first aspect a transportable refrigerated container having an interior chamber defined by a floor, a ceiling, a front end, a rear end and two sides, comprising a refrigeration unit for cooling the interior chamber, a plurality of partitions sub-dividing the interior chamber into separate compartments, the partitions being sufficiently sturdy to restrain movement of loaded goods during transportation of the container, and a plurality of unloading doors in at least one of the sides of the container, each door affording access only to a selected respective compartment or group of compartments, characterized in that the unloading doors are provided with different security locking mechanisms, and the partitions allow free circulation of air between the compartments whereby all the compartments are maintained at the same temperature.

Preferred features of the container are set out in claims 2 to 11 of the appended claims.

In accordance with a second aspect of the invention, there is provided a method of distribution of perishable goods from a supply depot to a plurality of customers, utilizing a container as set out above, which method comprises,
a) at the supply depot
  (i) placing the goods on roll cages,
  (ii) loading all the roll cages intended for a specific customer into the internal chamber of the container by way of a door at the rear end of the container,
  (iii) erecting a partition around the load cages to form a separate compartment accessible from only a selected door, or doors, in the sides of the container,
  (iv) repeating steps (i) to (iii) for remaining customers, and
  (v) transporting the container to a delivery location convenient for all the customers, and
b) at the delivery location
  (i) providing a plurality of delivery vehicles,
  (ii) issuing the driver of each delivery vehicle with a key or code for a respective one of the doors in the sides of the container,
  (iii) using the delivery vehicles to distribute the roll cages from each securely locked compartment to the intended customer, and
  (iv) transporting the container back to the supply depot.

In carrying out the present invention, an articulated lorry is used to deliver containers to different carefully selected locations, such as car parks, each located centrally in relation to several customers. The transportation of the containers can be carried out at night, thus enabling a single articulated lorry to make several such journeys between the depot and the selected locations. Thus, fewer lorries are needed by the wholesaler. Furthermore, the lorries spend far less time in densely populated areas, and they need not travel during rush hours, thus causing less traffic congestion and reducing pollution.

At each location, drivers of smaller vehicles are employed to transfer goods from the refrigerated container to the customer, and these can be provided either by the wholesaler or by the customer. In either case, the goods for each customer are securely held in a compartment of the container dedicated to that customer. Therefore, roll cages carrying goods can be removed from the container and empty roll cages can be put back in the compartment, with interfering with goods intended for another customer.

The transfer of goods from the container to a customer can be carried out at any time convenient to the customer, and in no specific order, thereby simplifying scheduled delivery. Furthermore, as different small vehicles may be used for each customer, the cumulative effect of traffic congestion on the timing of deliveries can be avoided.

The container of the invention is of critical importance to the method of distribution as it converts a serial operation, i.e. one where deliveries are carried out sequentially in time, to a parallel operation where the deliveries are independent events.

BRIEF DESCRIPTION OF THE DRAWINGS

The invention will now be described further, by way of example, with reference to the accompanying drawings, in which.

DETAILED DESCRIPTION OF THE DRAWINGS

Figure 1:
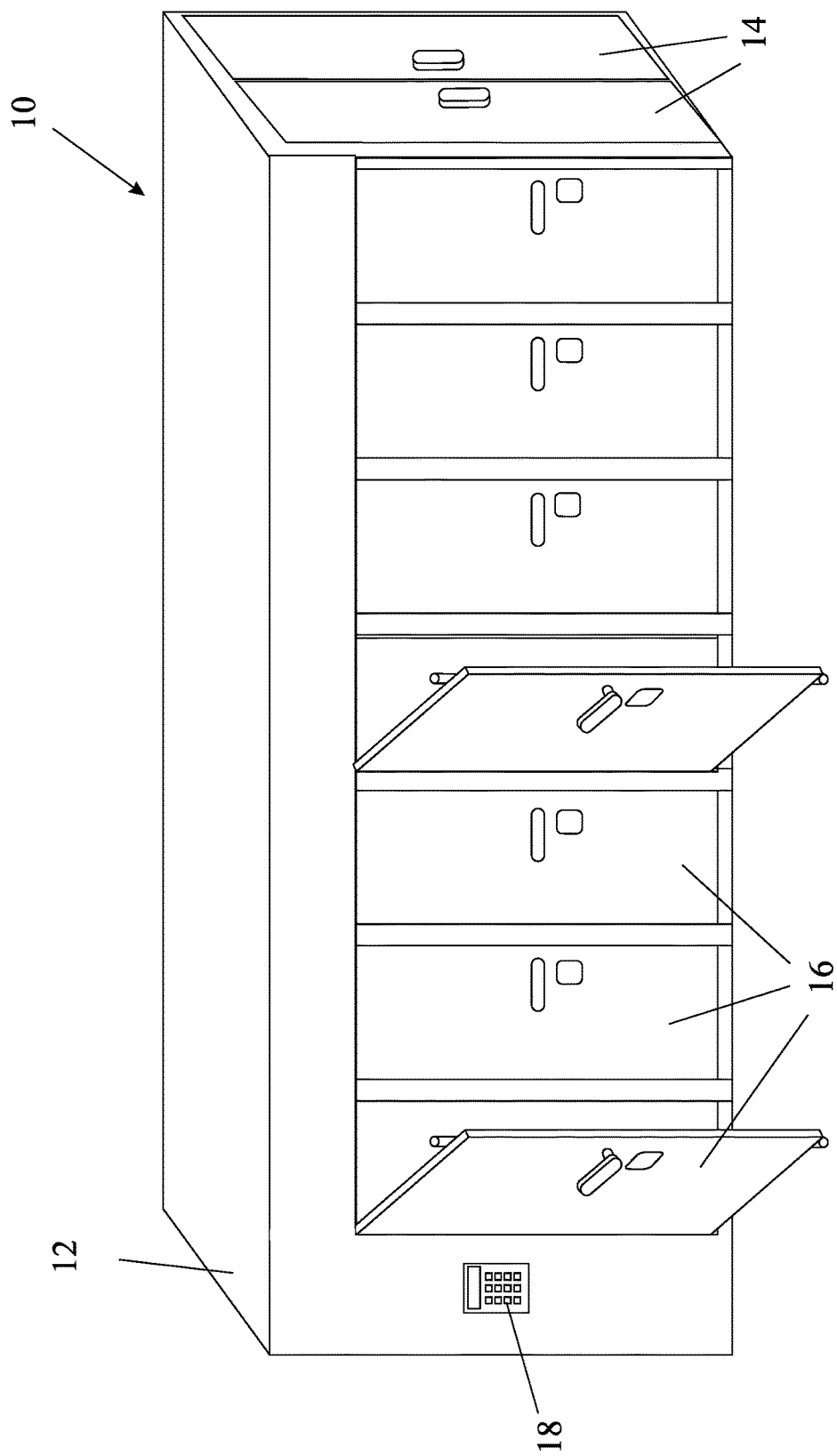
FIG. 1 is a perspective view from one side and one end of a refrigerated container of the invention.
Figure 2:
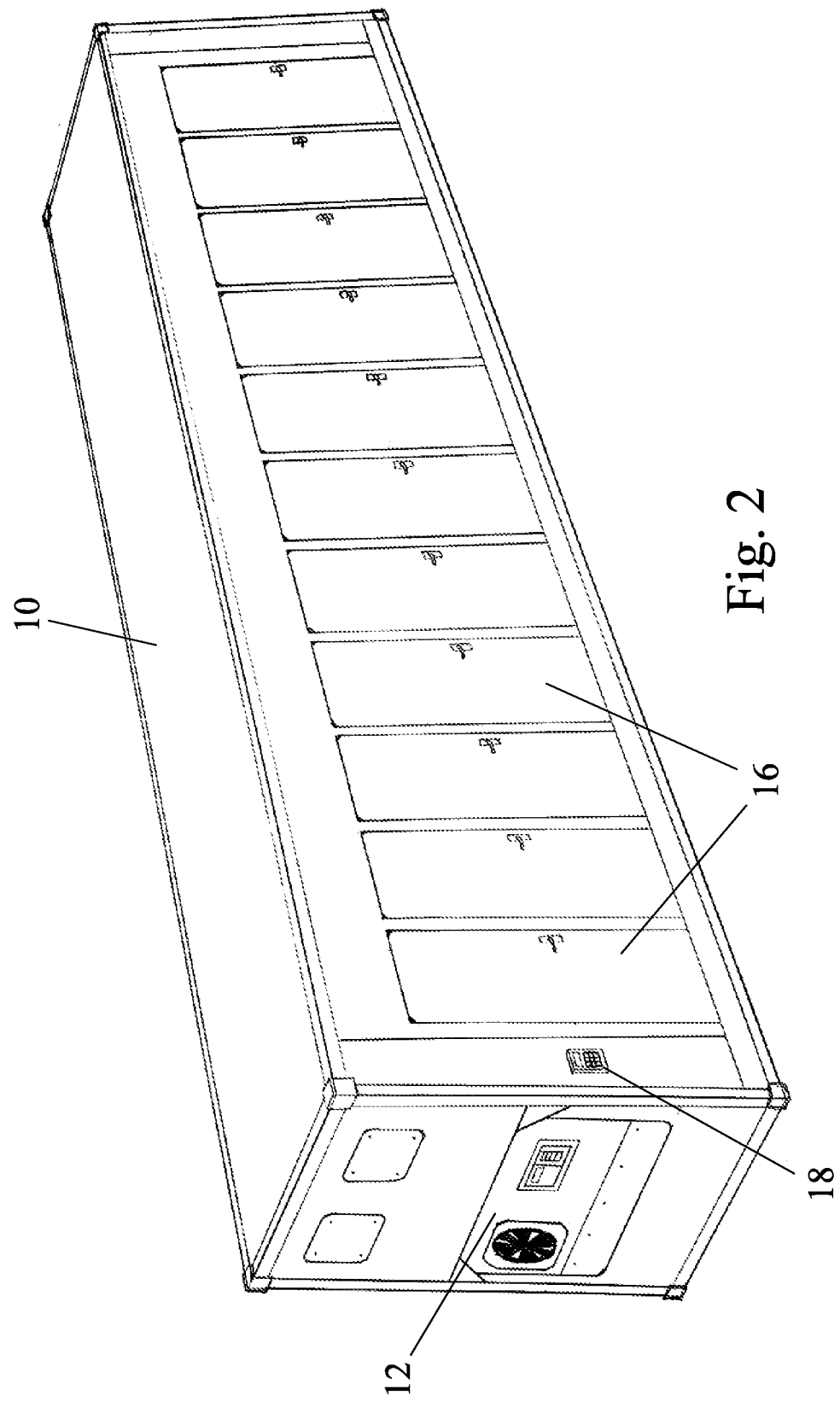
FIG. 2 is a perspective view from one side and the opposite end of a second refrigerated container having a greater number of internal compartments.

FIGS. 1 and 2 show refrigerated containers 10 intended to be loaded onto the trailer of an articulated lorry. Each container 10 has a powered refrigeration unit 12 at its front end while doors 14 at its rear end provide access to the interior chamber of the container 10. At least one side of the container is provided with multiple security doors 16 each affording access to a respective compartment within the interior chamber. The containers of FIGS. 1 and 2 differ from one another only in that the container of FIG. 2 has a greater number of doors 16 and internal compartments.

Individual compartments are formed within the interior chamber of the container by movable partitions that are shown in, and will be described by reference to FIG. 3. The partitions comprise mesh walls or screens 20 that are each permanently anchored by one edge to a side wall of the container 10 and are releasably connected at their opposite edge to the opposite side wall by means of cleats, carabiners, padlocks, cable ties or any suitable secure releasable attachment. The upper edge of each mesh wall may additionally be suspended by straps 24 to a bar 22 extending between the opposite sides of the container to prevent the mesh wall 20 from sagging. Once both edges of the mesh partition wall have been secured to the opposite sides of the container, the mesh wall 20 may be tensioned using a ratchet mechanism, which may be lockable.

Figure 3:
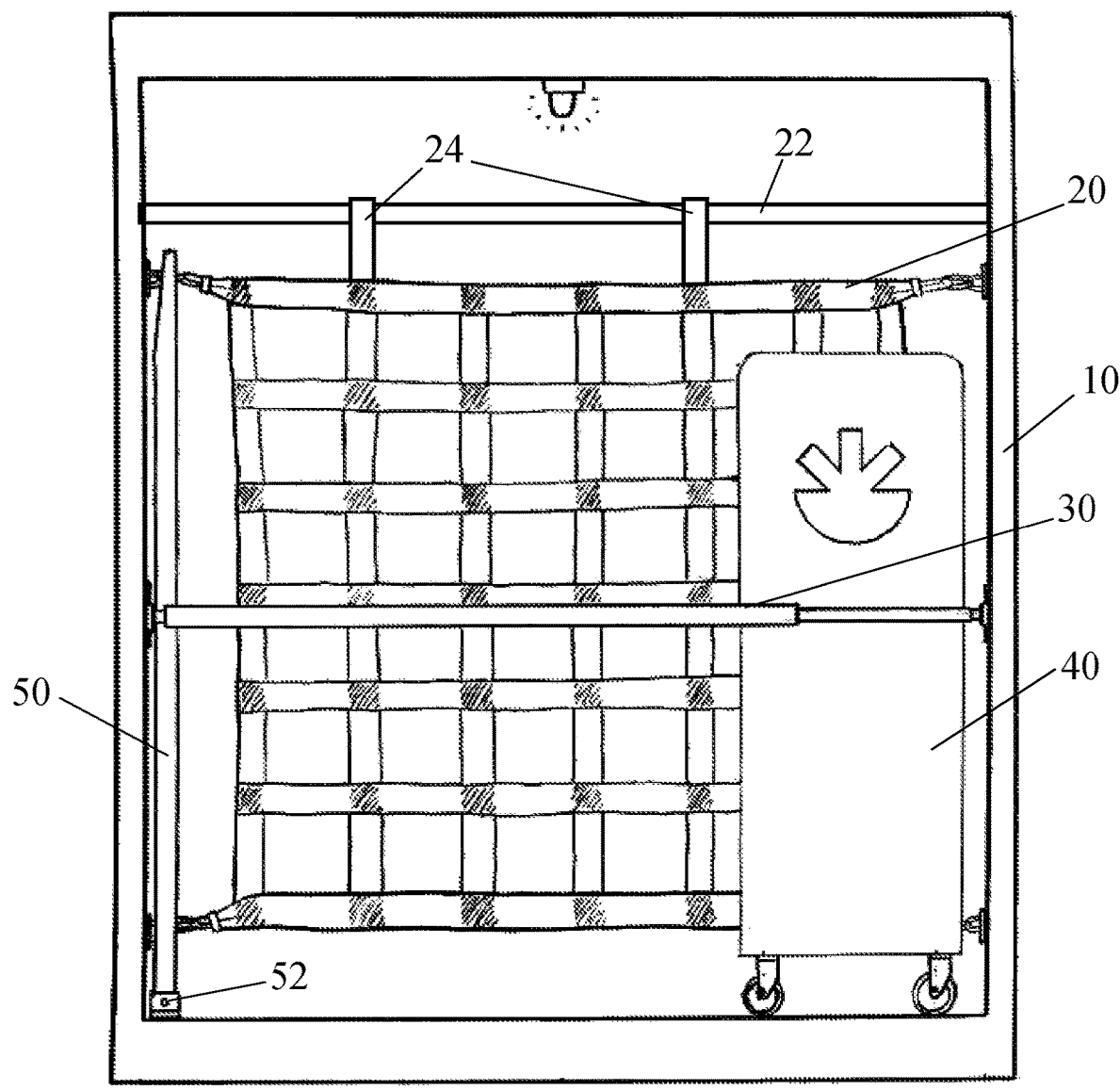
FIG. 3 is a schematic drawing of the interior of the container of FIG. 1, as seen from the rear end.

The mesh wall shown in FIG. 3 is formed of interwoven straps leaving large openings for refrigerated air to pass freely between the compartments, to maintain all the compartments at the same temperature. Alternative constructions of the mesh walls can be envisaged, it being only necessary for the walls to allow free air circulation and to act as a physical barrier between compartments, both for goods and for personnel.

Figure 4:
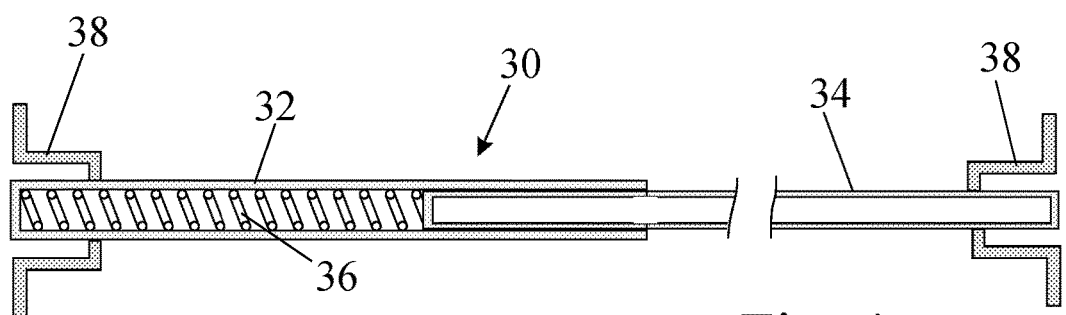
FIG. 4 is an illustration of the design of a telescopic load lock bar separating individual compartments to withstand movement of roll cages during transit.

Additionally, adjacent compartments are separated from one another by at least one load lock bar 30, as shown in more detail in FIG. 4. The load lock bar is a telescopically collapsible bar 30 made up to two sections 32 and 34, biased by means of an internal spring 36 in a direction to extend the bar. The ends of the bar 30 are received in holes in hat-shaped channels 38 secured to the two sides of the container.

The container 10 is intended for transporting food, or other perishable goods, loaded onto wheeled roll cages 40. The tensioned mesh partition walls 20 are intended to define separate compartments and to prevent the roll cages from rolling along the length of the interior chamber of the container. The load lock bars 30 can be used to anchor the rolls cages 40 to prevent them from moving from side to side.

The roll cages 40 may be fitted with conventional casters. Some casters may optionally be fitted with brakes, but this is not essential as it is preferred to rely on anchoring of the roll cages to the load lock bars 30.

At the depot, the lorry carrying the container 40 is reversed into a loading bay and the rear doors 14 are opened to allow access to the interior chamber. After opening the mesh wall partitions and emptying the interior chamber of any returned roll cages, fresh roll cages carrying food intended for any one of the customers are rolled into the chamber and moved as far forward as possible. A load lock bar 30 is connected between the side walls of the container and the roll cages are connected to it. Finally, one of the mesh walls 20 is drawn across to form a compartment that can only be accessed from the first side door 16 of the container. This process may then be repeated for the remaining customers and the remaining side doors, with no necessity for the loading to be carried out in any particular order.

Once the container has been filled, the container 40 is transported to a remote location, such as a car park, which is convenient for all the customers, being for example no more than fifteen to thirty minutes away from any one of the customers. There, the container can be connected to a power supply to enable the goods to be kept fresh until such time as they are collected and delivered to the customers. While at the remote location, the goods are secure as all the doors are fitted with secure locking mechanisms and can only be opened by authorized personnel.

The authorized personnel are delivery drivers employed either by the customer or the wholesaler. Delivery drivers may have vehicles much smaller than an articulated lorry as they are each only required to deliver to one customer. On arrival at the remote location, each delivery driver is afforded access only to the goods purchased by one customer.

It is desirable for the container to be fitted with safety system to safeguard against certain events, such one of the doors being opened or left open, light being detected within the internal chamber, movement being detected in the internal chamber, or the temperature in the chamber being sensed to lie outside a predetermined range. The safety system is intended to ensure that all goods remain correctly refrigerated until such time as they are collected for delivery and can communicate with a monitoring station, such as by using a telephone or internet connection, to alert a monitoring station of any problem.

To prevent goods intended for a customer from being removed from a roll cage, for example by someone reaching through a hole in the partition walls 20, it is desirable, as a first security measure, for all rolls cages to be enclosed. Sealing of the roll cages can be achieved by shrink wrapping, or more preferably by means of thermal covers fitted with zip fasteners that would also serve to keep the roll cages refrigerated during the last stage of transportation. Such sealing is sufficient to prevent pilfering and can also provide a visual indication of tampering.

To safeguard against more serious criminal activity, the interior and optionally also the exterior of the container may be monitored by cameras that record any activity within, or in the vicinity of, the container.

The side doors 16 are each fitted with a secure locking mechanism that can only be opened by authorized personnel delivering goods contained in the accessed compartment to a specific customer, to whom the goods are to be delivered. The secure locking mechanism may be opened by means of a mechanical key but more preferably it takes the form of an electronic lock released by means of secure code. In the latter case, the code may either be entered using a keypad, such as the keypad 18 shown in FIGS. 1 and 2, or by wireless transmission, for example using a mobile telephone. In all cases, the identity of a person opening a door is known from the key or the code used to open the door and, if desired, a record may be kept of all personnel accessing the interior chamber of the container.

The electronic code used to gain access to a side door 16 may be temporary and only valid for a set period of time. For example, a person authorized to gain access to a side door 16 may request or be given a code only valid for the day on which they require entry. The access codes may be communicated to the container 10 using a server-based system, thereby allowing the code to be changed remotely either once the period of time has ended, or when the authorized person has used their code to access a door.

In embodiments using a keypad to allow entry, only one keypad 18 need be provided on the container 10, the keypad being capable of operating the locks of all side doors 16 independently. The door release system may have some features to improve security, such as being able to log forced openings and unsuccessful access attempts.

After accessing a compartment, the delivery driver transfers the roll cages to be delivered to the specific customer onto a smaller vehicle, such as a van rather than a lorry, and places back into the compartment any roll cages to be returned to the depot from the customer. This delivery can be carried out at a time of day to suit the customer and the job of the delivery driver is simplified as it is not necessary to follow a specific route nor to adhere to a timetable.

To assist the delivery driver in moving roll cages off and onto the container 40, a ramp 50 is provided behind each side door 16, to allow the roll cages 40 to be removed easily from the container 10.

Each ramp 50 is fixed to the floor of the container 10 using hinges 52. The hinges 52 allow the ramp to pivot between two configurations, one being a vertical storage configuration (as shown in FIG. 3) in which it lies within the container stacked against the side door 16 when closed, the other being a deployed configuration that can be adopted once the side door 16 is open in which a free end of the ramp rests on the ground. The ramp comprises a frame connected to the hinges, and a plate supported by the frame to provide a surface on which a roll cage 40 can be moved.

The frame may take the form of a conventional ladder frame, comprising two parallel rails connected by cross members. The frame may be made of any material or cross section capable of withstanding the load of a roll cage 40. One example of a suitable material is mild steel box section.

The plate is attached to the chassis by any conventional means, such as welding, riveting, bolting etc. The plate advantageously sits below the level of the rails so that the rails provide a barrier to prevent a roll cage 40 falling off one side of the ramp. The plate may be manufactured from a high grip surface such as aluminum chequer plate (also known as tread plate).

The plate may have an angled portion so that when the ramp is in its deployed configuration, the angled portion meets the lip of the door frame and lies in the same plane as the floor of the container 10. Similarly, the rails may be chamfered at the end to allow the edge of the plate to contact the ground.

A slot in the plate may be provided to enable the user to maneuver the ramp more easily between its configurations. Further, an additional operating handle may be provided on the underside of the plate to aid moving the ramp.

It will be seen from the foregoing description that the invention offers numerous improvements in efficiency, both for the wholesaler and the customers, while at the same time reducing damage to the environment. Fewer large lorries are required by the wholesaler, journeys can be timed to avoid heavy traffic, and all customers can receive their orders at a time convenient to them rather than a time dictated by the route to be followed by a delivery driver.

The invention claimed is:

1. A transportable refrigerated container, comprising:
an interior chamber defined by a floor, a ceiling, a front end, a rear end and two sides of the container;
a refrigeration unit for cooling the interior chamber;
a plurality of mesh partitions sub-dividing the interior chamber into separate compartments, the mesh partitions movably affixed to the interior chamber, each mesh partition permanently anchored at one edge to a side wall of the interior chamber and releasably connected to an opposite side wall of the interior chamber by an opposed edge of the mesh partition; and
a plurality of unloading doors in at least one of the sides of the container, each of the plurality of unloading doors affording access only to a selected respective compartment or group of compartments, characterized in that each of the plurality of unloading doors is provided with a different secure locking mechanism, and wherein the mesh partitions comprise a plurality of openings to allow free circulation of air between the compartments through the partitions when the mesh partitions are closed whereby all the compartments are maintained at a same temperature.

2. The container of claim 1, where the refrigeration unit is located at the front end of the container and a loading door is provided at the rear end of the container.

3. The container of claim 1, wherein the mesh partitions are movable between an open position, to allow free access between different compartments during loading of the container, and a closed position in which the partitions prevent transported goods from being transferred between compartments.

4. The of claim 3, wherein goods loaded onto one or more roll cages, and wherein each mesh partition comprises a load lock bar extending between the two sides of the container onto which each roll cage is anchored.

5. The container of claim 4, wherein each load lock bar is formed of spring biased telescopically collapsible sections, the ends of the load lock bar being receivable in holes in channels secured to the sides of the container.

6. The container of claim 1, wherein each mesh partition comprises a screen made of a material capable of being folded, rolled or concertinaed.

7. The container of claim 6, wherein each screen is secured permanently along one edge to one of the sides of the container and is releasably secured to the opposite side, a tensioning strap being provided to enable the screen to resist movement of the load during transportation of the container.

8. The container of claim 1, wherein each mesh partition comprises a door formed of rigid sections capable of sliding relative to one another.

9. The container of claim 1, further comprising a safety system for alerting a remote monitoring station when at least one of the following events is detected, the events comprising:
- one of the doors is opened or left open,
- light is detected within the internal chamber,
- movement is detected in the internal chamber, or
- the temperature in the chamber is sensed to lie outside a predetermined range.

10. The container of claim 1, wherein a security system is provided that includes a plurality of cameras and memory for storing video data from the cameras at least during periods when movement is detected within the internal chamber.

11. The container of claim 1, wherein the unloading doors have electronic locks that can be opened by digital codes allocated only to authorized individuals.

12. The container of claim 11, wherein the security system is operative to store the digital codes employed to open the security doors.

13. The container of claim 11, wherein a radio receiver is provided to enable the codes required by the electronic locks to be transmitted by a mobile telephone.

14. The container of in claim 1, wherein a ramp is associated with each door in the side of the container, the ramp being pivotable between a vertical storage configuration resting within the compartment against the associated door and a deployed position in which the ramp lies outside the container and a free end resting on the ground.

15. The container of claim 1 further comprising at least a first strap extending between the opposed side walls of the container and second straps on at least one mesh partition to engage the bar and support the at least one mesh partition to prevent sagging of the at least one mesh partition.

16. A method of distribution of perishable goods from a supply depot to a plurality of customers, utilizing the container as claimed in claim 1, which method comprises,
   a) at the supply depot
      (i) placing the goods on roll cages,
      (ii) loading all the roll cages intended for a specific customer into the internal chamber of the container by way of a door at the rear end of the container,
      (iii) erecting a partition around the roll cages to form a separate compartment accessible from only a selected one or more of the plurality of doors, in the sides of the container, the partition comprising a mesh barrier, each mesh barrier permanently anchored at one edge to a side wall of the container and releasably connected to an opposite side wall of the container by an opposed edge of the mesh barrier, the erecting comprising connecting the releasably connected opposed edge,
      (iv) repeating (i) to (iii) for remaining customers, and
      (v) transporting the container to a delivery location convenient for all the customers, and
   b) at the delivery location
      (i) providing a plurality of delivery vehicles,
      (ii) issuing a driver of each delivery vehicle with a key or code for a respective one of the doors in the sides of the container,
      (iii) using the plurality of delivery vehicles to distribute the roll cages from each securely locked compartment to the intended customer, and
      (iv) transporting the container back to the supply depot.

17. The method of claim 16 further comprising installing at least one load lock bar between the opposed side walls of the container to restrain at least one of the roll cages intended for the specific customer.

18. The method of claim 16 further comprising attaching second straps on at least one mesh barrier to a first strap extending between the opposed side walls of the container to prevent sagging of the at least one mesh barrier.

* * * * *